(12) United States Patent
Rajpurkar et al.

(10) Patent No.: US 7,103,619 B1
(45) Date of Patent: Sep. 5, 2006

(54) SYSTEM AND METHOD FOR AUTOMATIC AUDIT DATA ARCHIVING WITHIN A REMOTE DATABASE BACKUP SYSTEM

(75) Inventors: Anagha Rajpurkar, Foothill Ranch, CA (US); Donald Ralph Hart, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 433 days.

(21) Appl. No.: 10/256,379

(22) Filed: Sep. 26, 2002

(51) Int. Cl.
*G06F 17/30* (2006.01)
(52) U.S. Cl. .................. 707/204; 707/202; 707/201
(58) Field of Classification Search ............. 707/1–10, 707/100–104.1, 200–204; 709/227; 714/6, 714/20
See application file for complete search history.

(56) References Cited

U.S. PATENT DOCUMENTS

| | | | |
|---|---|---|---|
| 5,758,150 A | 5/1998 | Bell et al. ................. 707/10 |
| 5,835,915 A | 11/1998 | Carr et al. ................. 707/202 |
| 6,151,608 A | 11/2000 | Abrams .................... 707/204 |
| 6,192,365 B1 * | 2/2001 | Draper et al. .............. 707/101 |
| 6,216,164 B1 | 4/2001 | Zaremba ................... 709/227 |
| 6,430,577 B1 * | 8/2002 | Hart ........................ 707/201 |
| 6,442,706 B1 * | 8/2002 | Wahl et al. ................. 714/6 |
| 6,473,776 B1 * | 10/2002 | Ieong et al. ............... 707/202 |
| 6,553,392 B1 * | 4/2003 | Mosher et al. ............. 707/204 |
| 6,691,115 B1 * | 2/2004 | Mosher et al. ............. 707/10 |
| 6,701,456 B1 * | 3/2004 | Biessener .................. 714/20 |
| 6,795,830 B1 * | 9/2004 | Banerjee et al. ........... 707/200 |

* cited by examiner

*Primary Examiner*—Jeffrey Gaffin
*Assistant Examiner*—Yicun Wu
(74) *Attorney, Agent, or Firm*—Alfred W. Kozak; Mark T. Starr; Lise A. Rode (57) ABSTRACT

In a network of primary and secondary servers having individual databases which are mirrored to each other, there is provided a method to increase resource availability by removal, of already-utilized audit files onto external storage. A TRACKER program for expediting the update of the secondary database will initiate a CopyAudit program which offloads the audit files on the secondary server and then signals the primary server to offload the audit file, of the primary, onto external storage.

5 Claims, 3 Drawing Sheets

SYSTEM AND METHOD FOR AUTOMATIC AUDIT DATA ARCHIVING WITHIN A REMOTE DATABASE BACKUP SYSTEM

FIELD OF THE INVENTION

A method for automatically archiving audit data within a remote database backup system so that a backup copy is maintained that does not require network use for audit transfer, and audit files that have already updated the database can be removed to an archive file.

CROSS-REFERENCES TO RELATED APPLICATIONS

This application is related to co-pending applications listed below, which are incorporated herein by reference:

U.S. Ser. No. 09/415,273 entitled "System And Method For Asynchronously Receiving Multiple Packets of Audit Data From A Source Databased Host In a Resynchronization Mode and Asynchronously Writing The Data To A Target Host".

U.S. Ser. No. 09/415,333 entitled "Tracker Sensing Method For Regulating Synchronization of Audit Files Between Primary And Secondary Hosts".

U.S. Ser. No. 09/951,996 entitled "Method Of Capturing A Physically Consistent Mirrored Snapshot Of An Online Database".

U.S. Ser. No. 10/177,175 entitled "Method For Reading Audit Data From A Remote Mirrored Disk For Application To Remote Database Copy".

U.S. Pat. No. 6,408,310 entitled "System And Method For Expediting Transfer Of Sectioned Audit Files From A Primary Host To A Secondary Host".

U.S. Pat. No. 6,044,444 entitled "Remote Data Mirroring Having Preselection Of Automatic Recovery Or Intervention Required When A Disruption Is Detected".

BACKGROUND OF THE INVENTION

The method of the present invention relates to a particular system and method for automatic audit data archive within a remote database backup system. A remote database backup is maintained by (i) transferring a package of audit data from a primary database system to a remote system process; (ii) then writing the audit data to a remote disk; (iii) then applying the audited changes to the remote database backup copy. When a network communication error occurs during the first step (i) involving transferring a package of audit data from a primary database to a remote system process, then, the primary database system activity is temporarily suspended.

This temporary suspension of database activity presents problems and is counter-productive to the goal of maintaining 100% database availability. Thus, in this regard, controlling the audit removal is thus an important issue in optimizing the resource utilization on both the hosts and will lead to improved system performance.

One prior art method to which the method of the present invention generally relates is described in U.S. Pat. No. 6,216,164, entitled "Computerized System And Method For Managing Information". This prior art method is a system and method for managing data stored in a database. A mainframe computer associated with the database is operable to execute customer information control system (CICS) transactions that control an application program for processing the stored data. An open socket command from a remote computer enables CICS sockets at the mainframe for connecting the mainframe and the remote computer via a web server. The remote computer communicates on a global network using a client-server communications protocol and the CICS sockets permit the remote computer to communicate with the mainframe by the client-server communications protocol. Following the open socket command, the CICS transactions are executable by the remote computer for controlling the application program at the mainframe. In another form, the system and method extract selected academic registration data from the database for generating a course audit report.

This method of the prior art differs from the present invention in that this prior art relates to methods that manage applications and the processing of stored data. The method of present invention, however, teaches methods to backup and remove audit data from disk. The method of the present invention also provides optimization of disk storage utilization that is not provided in the prior art method.

Yet another prior art method to which the method of the present invention generally relates is described in U.S. Pat. No. 5,835,915, entitled "Remote Duplicate Database Facility With Improved Throughput And Fault Tolerance". This prior art method is a local computer system having a local database, application programs that modify the local database, and a transaction manager that stores audit records in a local audit trail reflecting those application program modifications to the local database. Each audit record has an associated audit trail position. A remotely located computer system has a backup database. A remote data duplication facility (RDF) is partially located in the local computer system and partially in the remote computer for maintaining virtual synchronization of the backup database with the local database. The RDF includes an extractor process executed by said local computer system, and a receiver process and a plurality of updater processes executed by the remote computer system. The extractor process extracts audit records from the local audit trail and transmits those records to the receiver process. When the receiver process detects that it is receiving audit records not in accordance with a predefined sequence, it transmits an error message to the extractor process. Otherwise it distributes the received audit records to a plurality of image trail files in the remote computer system for processing by updater processes, which initiate redo operations of database modifications denoted in at least a subset of the audit records against the backup database. The extractor process responds to each error message by obtaining a restart audit trail position value from the receiver process and then extracting audit records from the local audit trail starting at that restart audit trail position value.

The method of the prior art and the method of the present invention are only similar in the resemblance of the present invention's use of the RDB (Remote Data Base) system in architecture. However, the method of this prior art does not solve the problem of the resource contention created by (1) the need to backup and remove audit data at the source and, (2) maintaining said audit data on disk until it is no longer needed by a remote computer system. The present invention, however, does indeed solve the problem of this contention by the methods discussed that (1) delay the removal of audit data at the source following backup, and (2) send a message from the remote computer system to the primary system to initiate the removal of audit data.

Yet another prior art method to which the method of the present invention generally relates is described in U.S. Pat. No. 5,758,150, entitled "System And Method For Database Synchronization". This prior art method is a database synchronization system (10) is disclosed that synchronizes the content of a central database stored on a central computer (16) with one or more remote databases stored on one or more remote computers (18). A data extract and transfer application (20) is provided on each of the remote computers (18). A migrator application (26) processes the audit trail files (24) of the remote computer (18) to create a database of change (28). When the database of change (28) reaches a size threshold, the data extract and transfer application (20) shuts down the migrator application (26), processes the database of change (28), and restarts the migrator application (26) to begin the creation of another database of change. The data and information in the database of change are converted into a series of flat files (48) that are transferred over a communications line (14) from each of the remote computers (18) to the central computer (16).

The method described in this prior art teaches methods of audit data extraction for the purpose of maintaining a remote database copy much like the present inventions RDB system, but does not teach the methods taught by the method of the present invention that (1) delay the removal of audit data at the source following backup, and (2) send a message from the remote computer system to the primary system to initiate the removal of audit data.

Yet another prior art method to which the method of the present invention generally relates is described in U.S. Pat. No. 6,151,608, entitled "Method And System For Migrating Data". This prior art method is a method and system of the invention migrate data from one or more ASCII files and/or from one or more relational databases to one or more relational database tables without the need to write code. In doing so, the invention allows the user to define mapping templates and conditionals to assist in translating and transforming data values. This method also enforces referential integrity, data dependencies, order of operations, and uniqueness constraints using a predefined set of migration rules templates that are based on the principles of relational design. The invention uses these mapping and migration rules templates to intelligently generate instructions for updating or populating relational database destination tables. The instructions control the data transfer, data translation, data transformation, data validation, foreign key insertion, and the addition of required codes and flags in the destination tables. A migration engine of the system includes a data map architect and an update processor which spawns the templates and migrates the data dynamically, utilizing the data definitions for the destination tables. In addition to supporting conversion efforts, this invention provides support for performing consolidation, restoration from an archive, migration to new instances, upgrading to a new release, adding bolt-ons and enhancements, and changing business requirements. The audit trail in the invention is complete enough that the entire migration process can be reversed without compromising the integrity of either the source or the destination application.

This method of the prior art differs from the method of the present invention in that the prior art teaches methods to migrate existing data and mentions an "audit trail" that records the entire migration process. However, the prior art fails to mention when or how to backup and remove audit data, whereas the method of the present invention teaches this in detail. Since audit generation, by its very nature, is an ever-increasing process, removal of this audit data is critical to maintaining disk resource utilization. The method of the present invention teaches the necessary methods to backup and remove audit data for enabling greater disk accessibility.

SUMMARY OF THE INVENTION

It is therefore an object of the present invention to realize an increase in resource availability by backing up the audit files at the primary and secondary hosts, by removal from the audit disks to external resources.

In order to accomplish this object, there is provided an algorithm whereby, after the audit application by a TRACKER program is complete on the secondary host and if the database is in the "mirrored audit mode" and a COPYAUDIT option is set for the secondary host, the TRACKER initiates the COPYAUDIT program which backs up the audit on the secondary host to the specified storage medium and sends a message to the primary host to remove/purge the audit file. Since the audit is mirrored, purging the audit file on the primary removes the audit from both the hosts. If the COPYAUDIT option is not set for the secondary host, then TRACKER sends the message to the primary host to remove the audit. The algorithm can be described in the following steps: (1) TRACER finishes applying the audit at the secondary host, (2) if the audit transfer mode is mirrored (AFM) and if the COPYAUDIT option is set for the secondary host, then, (3) TRACKER initiates the COPYAUDIT program to offload the secondary audit disk, (4) After the COPYAUDIT program finishes copying the audit file to the storage medium, it sends a message to the primary host to remove the primary audit file that was just copied, (5) If the COPYAUDIT option is not set for the secondary host, then TRACKER sends a message to the primary host to request the audit removal. (6) The audit file is removed from the primary (and secondary) host.

Still another object of the present invention is to remove audit files from both the hosts to free the disk space.

Still another object of the present invention is to establish a logical point of consistency in the audit trail at a primary database by initiating network communication from a remote database system.

Still another object of the present invention is to maintain the audit files on the primary disk until the audit application on the secondary host is complete.

Still another object of the present invention is to control the audit removal for optimization of system operation.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative, in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

GLOSSARY OF RELEVANT ITEMS

1. ACCESSROUTINES: The software component of the Unisys DMSII product that is primarily responsible for the accessing (creating, modifying and deleting) of data in a DMSII database. The Accessroutines is also responsible for auditing all changes to the database.

2. ACR: See Accessroutines.

3. ACTIVE TRANSACTIONS COMPLETED: See QUIET POINT.

4. ADMINISTRATIVE OPTIONS: In an RDB (Remote Data Base) system, user-interface options that initiate administrative tasks.

5. APPLICATION DEVELOPMENT: The activity of writing and testing database applications.

6. APPLICATION TRANSACTION STATE: The condition every update program of an audited database must enter in order to perform any data record update statements (e.g., STORE, DELETE, etc.).

7. AUDIT BLOCK: A structured package containing potentially many Audit Records (in the extreme situation, it is also possible that a single Audit Block could contain a partial Audit Record). There are a number of control words at the beginning and end of each Audit Block. Classically, the maximum size of an audit block is specified in the DASDL (Data And Structure Development Language) for each individual database; with the Extended Edition, it is possible for the ACR to extend this size dynamically. The size of an audit block is "rounded up" to fit into an integral number of disk sectors; it could occupy as few as 1 sector or (in the extreme) as many sectors as are in a disk row (specified in the DASDL via AreaSize).

Figure 1:
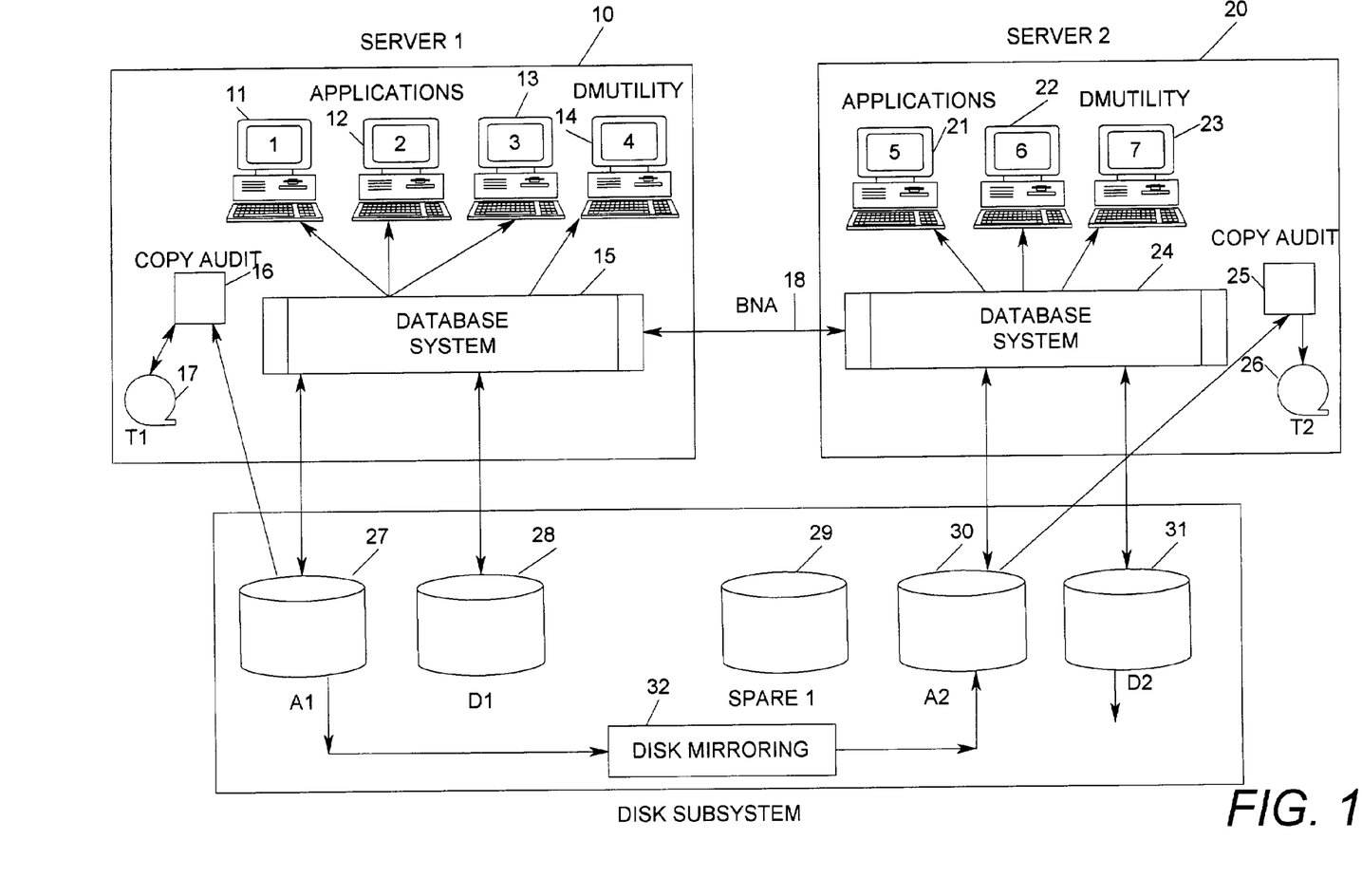
FIG. 1 is a drawing illustrating the elements involved to utilize a process to automatically auto archive data within audit files of a remote database backup system.

8. AUDIT BLOCK SERIAL NUMBER (ABSN): The first word of control information in an audit block, and the last word of control information in an audit block. Each audit block is serially numbered via the audit block serial number in ascending order, representing the order of operations performed on the database. When the maximum value of 268435455 is reached, the value is reset to 1, which is called a "rollover". The audit block serial number is commonly referred to as the audit ABSN. In FIG. 1, (n) refers to the next audit block serial number to be processed by TRACKER at the "secondary host"; (m) refers to the last audit block serial number processed by the database at the "primary" host.

9. AUDIT BUFFER: A system memory buffer maintained by the DMSII software into which an audit block is placed for ACCESSROUTINES access.

10. AUDIT FILE: Logically considered to be the sequential storage of Audit Records. Actually, the sequential storage of Audit Blocks, which contain the Audit Records.

11. AUDIT RECORD: A structured package of data built somewhere within the ACR (Access Routine) and stored (sequentially) into the Audit File. Header and trailer words of the record contain, among other things, the length and type of record.

12. AUDIT SECTION: With the Extended Edition, multiple MCP (Master Control Program) disk files can be used to physically implement a single Audit File. Each of these disk files is referred to as a "Section" of the Audit File. The sequence of Audit Blocks is spread, round robin fashion, among the multiple Audit Sections.

13. AUDIT TRAIL: The sequence of Audit Files that are created that span the life of the database. Each Audit File is assigned an Audit File Number (AFN) starting at 1 when the database is created and incremented by one when each new Audit File is created. An Audit File may be Sectioned or not. The individual Sections of an Audit File all share the same AFN (Audit File Number) value, although they each have a unique section number within their Audit File.

14. AUDIT TRANSFER: In an RDB (Remote Data Base) system, a method of transmitting audit images from the source host to the target host.

15. AUDIT TRANSFER MODE (AFM): This involves the transfer of audit files via mirroring from a primary database to a secondary database.

16. AUDITED CONTROL POINTS: See CONTROL POINTS.

17. BACKUP: A copy of the primary database files stored on magnetic tape or disk storage. BACKUP aka DATABASE BACKUP aka DATABASE DUMP: This database backup is created as a database dump, which is specially stored and verified copy of database files and associated database system files. A database dump may be a full copy of the database, a subset of the database files, or a selection of files changed since the last backup.

18. BCV: An acronym for Business Continuation Volume. EMC provides the ability to create a duplicate of a disk, which can then be processed independently of the original disk. The duplicate is called a Business Continuation Volume (BCV). A BCV contains a mirror image of an active production volume. The BCV can be separated from the production volume, allowing separate tasks to operate on independent data images.

19. BNA NETWORK: The network architecture used on Unisys ClearPath Enterprise Servers to connect multiple, independent, compatible computer systems into a network for distributed processing and resource sharing.

20. CERTIFICATION: The process of verifying the physical consistency of a database or portion of a database.

21. CONFIGURATION OPTIONS: In an RDB (Remote Database Backup) system, user-interface options that initiate configuration tasks.

22. CONTROL POINT: A logical construct within the Unisys e-@ction Enterprise Database Server used to limit the number of audit records, which must be reprocessed in the event of a system failure. Data buffers which have been modified are guaranteed to be written to disk at least once every two control points, thus halt/load recovery need only process changes since the second to last control point in an audit trail. Control Points occur on a user-specified frequency defined in SYNC points (See Glossary #86).

23. CopyAudit: An optional program which is used to back up the audit files at the secondary host and store them at a specified storage medium after which it sends a message to the primary host to execute a REMOVE/PURGE on the primary audit file where the audit file can be stored on auxiliary tape or disk.

24. DASDL: Data And Structure Definition Language. The language used to specify the structure and specific software configuration for a database.

25. DATABASE ANALYSIS: The process of analyzing the physical structure of database files.

26. DATABASE AVAILABILITY: The availability of data files within a database system.

27. DATABASE BACKUP COPY: A copy of a database, located at a computer system other than the computer system of the live database, that is available for inquiry and is updated with changes made to the live database through application of the audited changes to the live database. The database backup copy of the live database is not only a physically consistent copy of the database files, it is a functioning copy of the database system, available for inquiry access by application programs. This database backup copy may be used to offload inquiry-only access from the live database, thereby increasing availability of the live database, and is ready to take over live database activity in the event of a failure at the live database system. When the database backup copy is located at a remote location, it is especially useful for takeover of live database activity in the event of a site disaster, providing minimal interruption of business activity.

28. DATABASE CONTROL FILE: A special file required by the DMSII software on all databases. System-level information is stored in the Control File, which the ACCESS-ROUTINES use to manage the database. The Control File also provides a place for exclusive users of the database, such as DMUTILITY to mark the database as unavailable.

29. DATABASE EXTRACTIONS: Data that is read from a database.

30. DATABASE INTEGRITY TESTING: The process of testing the physical consistency of data files within a database.

31. DATABASE PROCESSING: Database processing in a mirrored disk environment.

32. DATABUFFER: A system memory buffer maintained by the DMSII software into which a data block is placed for ACCESSROUTINES access.

33. DATA SET: A disk file (potentially, a group of disk files) containing data records all in a similar format. An e-@ction Unisys Enterprise Database Server structure type declared in DASDL (Data And Structure Definition Language).

34. DATA WAREHOUSING: A copy of data specifically structured for querying and reporting.

35. DBA: DataBase Administrator. The person within an organization who is responsible for the development, maintenance, and security of databases.

36. DISASTER RECOVERY: The recovery of any event that had created an inability for an organization to provide critical business functions and data for some predetermined period of time. Generally, this involves reconstituting database files, which were lost or unavailable.

37. DISK ROW: The minimum allocation of disk space via the MCP (Master Control Program). A disk file is composed of a sequence of disk rows that may occupy arbitrary locations on the disk media. Within a disk row, all blocks are allocated at sequential disk addresses.

38. DMSII: Unisys Data Management System II. The comprehensive, primary database management software package in use on Unisys A Series family of mainframe computers.

39. DM UTILITY COMMANDS: Commands used to manage a physical database.

40. EMC: A global enterprise storage company.

41. EMC SRDF: See SYMMETRIX REMOTE DATA FACILITY.

42. EMC TIMEFINDER: A business continuance solution, which allows customers to use special devices, that contains a copy of Symmetrix devices from an attached host(s) while the standard Symmetrix devices are on-line for regular I/O operation from their host(s).

43. FLUSHING TO DISK: The process of writing system memory buffers (data and/or audit) to disk.

44. FUTURE TRANSACTIONS SUSPENDED: The process of preventing database applications from entering a transaction state.

45. HMP: Heterogeneous Multi-Processor.

46. INTEGRATION TEST: The act of combining individual units and components, and then testing them to ensure that the individual units and components still function as expected.

47. LOGICALLY CONSISTENT DATABASE: An online database whose consistency is maintained by data buffers and physical data files.

48. m=: A symbol value, which refers to the last Audit Block Serial Number (ABSN), processed by the database at the primary host.

49. MARC: Menu Assisted Resource Control. A menu-based interface to Unisys A Series systems for the purpose of entering system commands.

50. MCP/AS: Unisys Master Control Program/Advanced Systems. The comprehensive virtual memory operating system, which drives the Unisys A Series family of hardware.

51. MCP ENTERPRISE SERVER REMOTE DATABASE: In an RDB (Remote Data Backup) system, the database copy that resides at the remote host.

52. MCP TO RDB DATABASE OPERATIONS CENTER GUI: The complete set of Remote Database Backup Operations (Configuration, Administrative, and Monitoring) contained within the Database Operations Center graphical user interface.

53. MIRROR FAMILY: One or more physical disks that share a family name and contain mirrored images of all data from a source family of disks.

54. MIRRORED AUDIT TRANSFER: In an RDB (Remote Data Backup) system, a method of audit transfer where target audit data is available on a mirrored family of disks.

55. MIRRORED COPY: See MIRROR FAMILY.

56. MIRRORED DATA TRANSFER: A method of maintaining a mirrored family of disks containing data files.

57. MIRRORED DISK: A disk which is a mirror image of its source disk (e.g. Family Name, Serial number and capacity are identical).

58. MIRRORED SNAPSHOT: A mirrored copy of data that is split from its source data.

59. MONITORING OPTIONS: In an RDB system, user interface options that initiate the monitoring of audit generation and audit transfer activities.

60. n=: A symbolic value which refers to the "next" Audit Block Serial Number (ABSN) to be processed by the TRACKER program at the remote secondary host.

61. OFFLINE DATABASE SYSTEM: A database system that is in a state of inactivity whereby no data files are being accessed from the database.

62. OFFLOAD PROCESSING: The process of dividing database access activities by creating one or more copies of a database.

63. ONLINE IN DATABASE SYSTEM: A database system that is in a state of activity whereby data files are being accessed from and/or modified to the database.

64. PDS: Product Definition System:. The Unisys internal system containing ordering and configuration information for all Unisys products.

65. PHYSICALLY CONSISTENT DATABASE: A database whose consistency is established when no applications are in a transaction state and all data buffers are flushed to disk.

66. POINT-IN-TIME SNAPSHOT: A mirrored snapshot that is split at a specific point in time.

67. PRIMARY DATABASE: The live database where updates are being made.

68. QUIESCE DATABASE: A database that is in a physically consistent state, i.e., all data buffers are flushed to disk. QUIESCE is a command from the data management utility command program, which freezes the use of a database when audit files are being used to update that database.

69. QUIET POINT: Location in the Audit trail where no program is in transaction state.

70. RDB: Remote Database Backup. A Unisys product which provides real-time backup services for the Unisys DMSII database as part of a disaster recovery plan. Remote Database Backup is suitable for use with A Series Databases.

71. REAL TIME REMOTE DATABASE ACCESS: Access to a remote database copy while the copy is kept current with its source database.

72. REMOTE COPY AUDIT: The activity of backing up a remote audit file that is a copy of its source.

73. SAN: Storage Area Network.

74. SAN MIRROR DISK MANAGER: A ClearPath system software feature that makes it possible to split off a copy of a disk family within the same MCP (Master Control Program) environment as the source volumes, regardless of the type of disk.

75. SCHEDULED BACKUP: A backup that is scheduled to be performed at a predetermined time.

76. SECONDARY DATABASE: The database backup copy where updates are being applied from the audited changes to the primary database.

77. SINGLE HOST BACKUP: A backup that occurs at the same host as its database source.

78. SNAPSHOT COPY: The term "snapshot copy" is used to identify a copy of an MCP (Master Control Program) family which has been provided unique identification. This allows the "snapshot copy" to coexist within the same MCP environment as its original.

79. SOURCE COPY: In a mirrored database environment, the initial database copy that is mirrored onto a target database.

80. SPLIT MIRRORS: Target mirrored disk copies that are split from their original (source).

81. SSR: System Software Release. A package of system software and related documentation that is periodically released to the field for A-Series computer systems.

82. STORE SAFE: A storage software feature that enables a site to ensure that multiple copies (mirrors) of disk data are coherent.

83. STORE SAFE MEMBER: A member of a mirrored set that has been assigned a store safe name.

84. SYMMETRIX: EMC corporation's enterprise storage system.

85. SYMMETRIX I: In an SRDF (Symmetrix Remote Data Facility) environment, the disk storage subsystem that represents the source (primary).

86. SYMMETRIX II: In an SRDF environment, the disk storage subsystem that represents the target (secondary).

87. SYMMETRIX REMOTE DATA FACILITY (SRDF): EMC's disk-mirroring software solution for use with Symmetrix hardware.

88. SYNC POINT: A quiet point (in the audit trail) that is forced to occur every "n" transactions; here Audit buffers are flushed.

89. TRACKER: An asynchronous RDB (Remote Database Backup) task declared and processed from Accessroutines. Its function is to rebuild the database. The TRACKER program senses the difference between primary audit blocks waiting to be transferred to the secondary—and the number of audit blocks received at the secondary which will be used to update the secondary database.

90. TRANSACTION: A cycle which starts with a Read or a Write operation and continuing until completion. Thus, "Read" data is accessed by the Requestor or the Write data is flushed to reside onto the database disk.

91. UCF: User Communication Form. A form used by a Unisys customer to report problems and express comments about Unisys products to support organizations.

92. VDBS: Visible DataBase Stack. A set of commands, which are issued directly to a database stack to interrogate or change some aspect of the database configuration.

93. VARIOUS DATABASE FUNCTIONALITY:
  a. RDBUTILITY
    (i) RDBUTILITY is a menu-driven user interface for defining, installing, and maintaining a Remote Database Backup system.
    (ii) RDBUTILITY is used to configure the operations of the database within each Remote Database Backup system. RDBUTILITY also reports the status of audit transmissions under the ABW audit transmission mode and provides database and network cumulative statistics about audit transmissions.

b. DBCENTER (i) DBCENTER is a graphical user interface for defining, installing, and maintaining a Remote Database Backup system.

(ii) DBCENTER is used to configure the operations of the database within each Remote Database Backup system. DBCENTER also reports the status of audit transmissions under the ABW audit transmission mode and provides database and network cumulative statistics about audit transmissions.

c. RDB Control File (i) The RDB Control file is a file that is created by the primary host database system during the initial configuration of an RDB system.

(ii) The RDB Control file contains information that controls both database and Remote Database Backup system behavior at the primary and secondary hosts.

d. RDB AGENT (i) RDB Agent is an asynchronous task processed from the RDB support library.

(ii) The function of RDB Agent is to periodically initiate interhost communication to periodically monitor remote database system behavior.

The above designated functions are described in a Unisys Corp. document identified as—Unisys e-@ction<mailto:e-@ction>ClearPath—Enterprise Servers Remote Database Backup Planning and Operations Guide (8600 2052-305) MCP Release 7.0 November, 2001

94. RDB SYSTEM (Remote Database Backup): This is a Unisys Corporation system for backup of a database and is referenced by a Unisys Publication Item 8600-2052-304 dated December, 1998, entitled "Remote Database Backup—Planning and Operations Guide."

95. RDB SUPPORT LIBRARY: In an RDB system, the library that is accessed by the shared task, database utilities, and additional applications responsible for configuring an RDB system. The library is also a running process responsible for initiating local and remote tasks through port file communication.

96. TRACKER PROGRAM: This is a specialized program which operates to observe the number of audit blocks received by a secondary host and can contrast this and measure this against the number of audit blocks residing in the primary host (which are yet to be transferred to the secondary host). When a certain critical value occurs in this contrast between the two sets of audit block files, then the Tracker program will institute a "speed-up process" to expedite the transfer of audit blocks from the primary host to the secondary host until a more desirable level of parity and duplication occurs between the audit files and the primary host and those in the secondary host.

Notes:

EMC=Trademark™ of EMC Corp.

Symmetrix is a copyright of EMC.

SRDF=TM of EMC.

ClearPath=TM of Unisys.

Windows NT-Copyright of Microsoft.

DESCRIPTION OF PREFERRED EMBODIMENT

FIG. 1 is a diagram of a remote database backup (RDB) system environment. The main primary server 10, such as a Unisys ClearPath NX server is used to run several different applications and utilizes the personal computer client-users 11, 12, 13, and a DMUTILITY, program 14 which can export a command designated "QUIESCE", which can interact with and access the primary database 15. The applications labeled 11, 12 are read/write applications, whereas 13 is a read only application.

The secondary server 20 contains applications available to the secondary client-users, which interact with and access the secondary database system 24. The applications labeled 21 and 22 are read only applications, whereas 23 is a DMUTILITY, program which can export a command "QUIESCE" when a database is being updated from an audit file.

Both the primary and secondary database systems have bus means 18 of communicating with each other. The primary and secondary database systems can communicate via a network channel BNA 18 shown in FIG. 1.

In the primary server system 10, the disk 28 contains data files written to and read by the database system at the primary server 10. The data files contained on disk 28 are sent back and forth between disk 28 and the database system 15. The audit files at disk 27 are also sent back and forth between disk 27 and the primary database system 15. The tape 17 contains audit files that are backed up by the CopyAudit program 16 from disk 27, thus relieving the load on disk 27.

In the secondary remote server host 20, disk volume 30 contains a physically mirrored copy of disk volume 27 (A1), which contains audit files written from the primary database system 15. Disk volume 31 (D2) contains data files written to and read by the database system at the secondary server 20. The data files are updated by the Tracker process of reading the mirrored audit files and applying changes to the remote database copy. The secondary tape unit 26 contains the audit files backed up onto tape 2 by CopyAudit program 25 from audit file disk 30 (A2).

The disk mirroring system 32 of FIG. 1 could, for example, be a product of the EMC Corporation of Hopkinton, Mass., as represented in the U.S. Pat. No. 5,742,792 to Moshe Yanai, et al. Thus, two data base primary and secondary storage systems are interconnected by a data link for mirroring of audit files between disk 27 (A1) and disk 30 (A2).

In the present embodiment utilized herein, each volume of local primary data is configured as a local audit data (A1) on disk 27 and local database information (D1) on disk 28. The source audit data on disk 27 (A1) is connected via the disk mirroring system 32 to a target disk volume 30 (A2).

Figure 2:
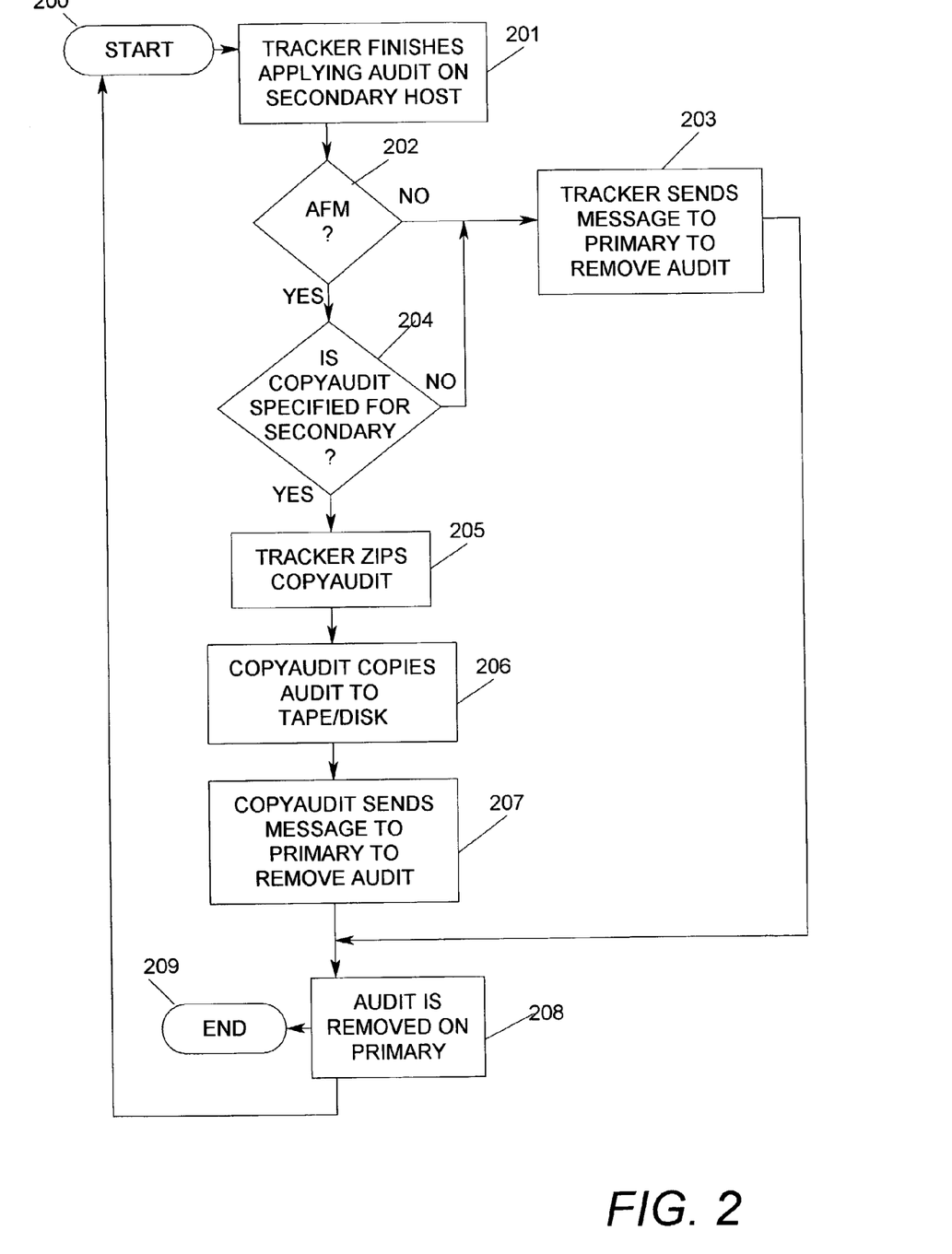
FIG. 2 is a flowchart illustrating the process of removing audit files from the primary database.

Now referring to FIG. 2, a flowchart illustrating the process of removing accumulated audit files from the primary and secondary database is shown. This process begins with start bubble 200, and is followed by the Tracker finishing the application of the audit on the secondary host (Block 201). The Tracker program is described in U.S. Pat. No. 6,446,090, entitled "Tracker Sensing Method For Regulating Synchronization Of Audit Files Between Primary And Secondary Hosts". An inquiry is followed to check the usage of RDB audit transfer mode (AFM) which uses the disk mirroring 32 (Diamond 202). If the answer to inquiry 202 is No, the Tracker sends a message to the primary database to remove the audit (Block 203) by transfer to Tape T1 (17) of FIG. 1. The process then initiates audit file removal from the primary database (Block 208). Then process then ends at bubble 209. If the answer to inquiry 202 is Yes, another inquiry is made (Diamond 204) to check to see if the CopyAudit program is specified for the secondary database 24. If the answer to inquiry 204 is No, the Tracker sends a message to the primary to remove audit (Block 203), which then initiates audit file removal from primary audit disk 27 (A1)(Block 208), and then exits at bubble 209.

If the answer to inquiry 204 is Yes, the Tracker initiates CopyAudit for execution (Block 205). The CopyAudit then copies the audit files to tape/disk (Block 206), which is followed by a process where the CopyAudit sends a message to primary database 15 to remove the audit files (Block 207). Audit file removal is then initiated from primary audit disk 27 (A1) at block 208. The process then exits at bubble 209.

Figure 3:
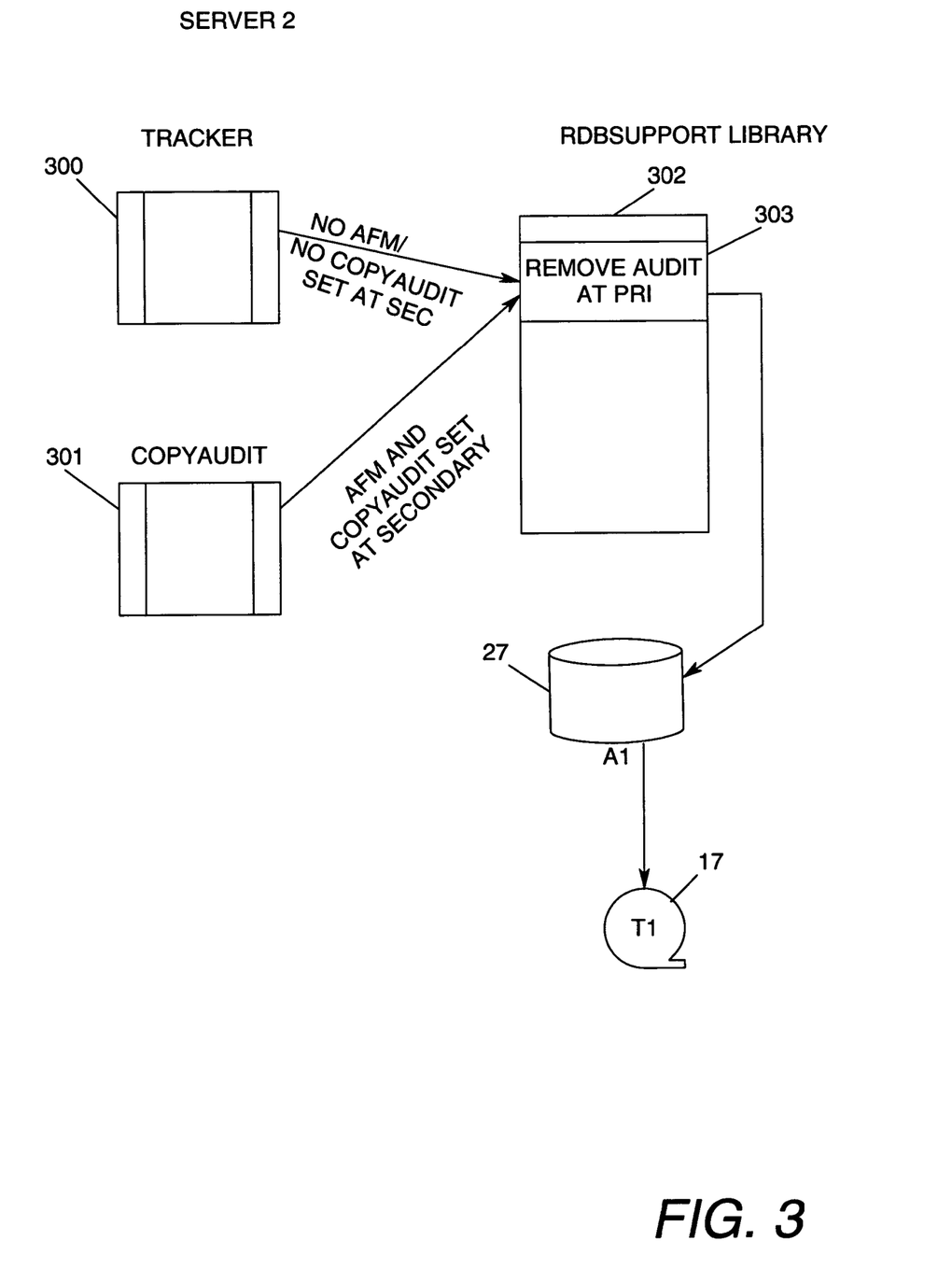
FIG. 3 is diagram illustrating the use of the Tracker program and the CopyAudit program, and the connection made to the RDBSupport library to remove audit files to free up disk space for new audit files.

Now referring to FIG. 3, a diagram illustrating the use of the Tracker program and the CopyAudit program and the connection made to the RDBSupport library to remove the audit files from the database disks, is Tracker program 300, CopyAudit program 301, and an RDBSupport Library 303. The Tracker program 300 checks for the condition of "No audit transfer mode" (AFM), and also that there is no CopyAudit program set at the secondary server 20. Tracker sends this information to remove the audit files at the primary audit disk seen at step (303). The CopyAudit program verifies existence of an audit transfer mirror mode (AFM), and then copies the audit file set at the secondary database to place the audit files on T2, 26. Then a command message is sent to remove the audit files at primary disk 27 (A1) at step (303). There is, then provided, a remote communication request between the Tracker program, CopyAudit, and the RDBSupport library, as described in the cited pending application, U.S. Ser. No. 09/415,333 which issued as U.S. Pat. No. 6,446,090.

Described herein has been a network of primary and secondary servers having primary and secondary databases which are kept consistent (synchronized) with each other and which allow concurrent transactions to be executed at both the primary and secondary databases. In order to enhance serviceability of the servers involved, a method of purging audit files on the primary and secondary database audit disks is effectuated after the audit file disk information is transmitted from each respective audit disk to its associated data disk in the primary and secondary databases. The purging of audit disks is instituted after the Tracker program has updated the secondary database disks and commanded the primary database disks to be removed. A CopyAudit program in each database facilitates removal of audit files and copies them to tape.

While a preferred embodiment of the invention has been described, it should be realized that other variations of this system and method may be realized which still fall within the scope of the attached claims.

The invention claimed is:

1. A method for purging already-utilized audit files in a primary and secondary database to enhance the utility of primary and secondary audit disks means comprising the steps of:
  (a) completing, at said secondary database, of the use of a Tracker program to update said secondary database to make it consistent with said primary database wherein step (a) includes the steps of:
    (a1) finding, by said Tracker program, that said secondary audit disk means is not supported by a COPYAUDIT program;
    (a2) notifying such finding of step (a1) to an associated remote database support library;
    (a3) commanding, via said remote database support library, that said primary audit disk means be purged of its audit files;
  (b) utilizing a COPYAUDIT program to offload audit files in said secondary audit disk means onto a secondary external storage means after said update in step (a) wherein step (b) includes the steps of:
    (b1) finding that no COPYAUDIT program is available for said secondary audit disk means;
    (b2) initiating, by said Tracker program, via a support library means, of a purging operation at said primary audit disk means;
  (c) initiating, a COPYAUDIT program at said primary database means to delay the audit file removal at said primary audit disk means before enabling the offload of audit files on said primary audit disk means onto a primary external storage means said delay enabling step (b) to be completed first in time sequence.

2. A method for purging audit disk files in a network of primary and secondary database means wherein each said primary and secondary database means includes an audit disk and a data disk, a primary and secondary Tracker means to institute a speed-up process for transfer of audit files from said primary audit disk to said secondary audit disk, a Support Library for initiating tasks at said primary and secondary database means and a primary and secondary COPYAUDIT program which operates to backup audit files to a specified storage medium, comprising the steps of:
  (a) completing, by said secondary Tracker means, of insuring consistency between said primary and secondary data disks;
  (b) checking to see that an automatic mirroring mode is operational between said primary and secondary audit disk wherein step (b) includes the steps of:
    (b1) finding that said automatic mirroring mode (AFM) is not in operation;
    (b2) transmitting, to said Support Library by said Tracker means, a signal for initiating a command message to said primary database to remove audit files in said primary audit file after said delay indicated in step (f);
  (c) sensing that said COPYAUDIT program is applicable to said secondary audit disk;
  (d) executing said Tracker means to notify said Support Library to initiate a COPYAUDIT program;
  (e) copying said secondary audit file to a secondary external recording medium while delaying the removal of said primary audit file until said secondary audit file has been utilized and removed;
  (f) transmitting a signal, by said secondary COPYAUDIT program, to said primary database means to initiate removal of said primary audit files after first delaying the removal of said primary audit files until said secondary audit file is removed to an external recording medium wherein step (f) includes the step of:
    (f1) copying of said primary audit file to an external primary recording medium.

3. An apparatus for purging already-utilized audit file means in a primary and secondary database means wherein said primary and secondary database means holds primary and secondary audit file means and has connection means between a first database system and a second database system and includes, at said first and second database means, a remote backup database Support Library, a Tracker program means and a COPYAUDIT program means, said apparatus comprising:

(a) mirroring means during a mirrored audit mode to maintain consistency between said primary audit file means and said secondary audit file means;

(b) said Tracker program means for enabling the speedup of secondary audit files for updating said secondary database means to maintain consistency between said first and second database means;

(c) said COPYAUDIT program means responsive to said remote backup database Support Library and said Tracker program means for removing audit files from said primary and secondary audit file means when instructed by said Tracker program means via said Support Library in a regulated sequence whereby removal of said primary audit file means is delayed until completion of the removal of said secondary audit file means;

(d) storage medium means, external to said primary and secondary database means, for receiving copies of said primary and secondary audit file means as a result of the execution of said COPYAUDIT program means.

4. A system for removing already utilized primary and secondary audit files which have been used to update associated primary and secondary database files in a network where primary and secondary server means provide transaction processing capability to multiple client-users at said primary and secondary server means comprising:

(a) primary server means having a primary database means which includes a primary audit file disk means and a primary database disk means;

(b) secondary server means having a secondary database means which includes a secondary audit file disk means and a secondary database disk means;

(c) connection means between said primary and secondary database means which includes:

(c1) disk mirroring means connecting said primary audit file disk means and said secondary audit file disk means;

(c2) bus channel means connecting said primary and secondary database means;

(d) Tracker program means for applying audit updates from said secondary audit file disk means to said secondary database disk file means;

(e) means for enabling the purging of audit files which includes:

(e1) means to sense that a COPYAUDIT program is available to said secondary audit file disk means;

(e2) means to purge said secondary audit file disk means for storage on an external secondary storage means after completion of said audit updates in step (d);

(e3) means to initiate, after completion of step (e2), a COPYAUDIT program at said primary audit file disk means to offload its audit files onto a primary external storage means.

5. In a network wherein a primary server and secondary server each have respective access to a primary database means and a secondary database means which mirrors audit files of said primary database means, and wherein a Tracker program means operates to speed up the transfer of primary audit files from said primary database means to secondary audit files at said secondary database means, to work with a Support Library means to initiate audit file purging, a system for purging audit files of said primary and secondary database means after database updates to said secondary database means have been completed comprising:

(a) a first audit file means in said primary database means for storing changes to said primary database means;

(b) a second audit file means in said secondary database means for updating said secondary database means;

(c) Tracker program means in said secondary database means for enabling the updating of said secondary database means to maintain consistency with said primary database means;

(d) COPYAUDIT program means at said primary and secondary database means for purging said first and second audit file means after initiation by said Support Library means responsive to said Tracker program means, said purging of said first audit file means being delayed until after the purging of said second audit file means has been completed wherein said COPYAUDIT program means includes:

(d1) means to remove audit files from said first and second audit file means and copy said files to an external recording medium.

\* \* \* \* \*